United States Patent [19]

Hjorth-Hansen

[11] Patent Number: 4,510,979
[45] Date of Patent: Apr. 16, 1985

[54] APPARATUS FOR CONTROLLING THE INFLATION OF TIRES

[76] Inventor: Arne Hjorth-Hansen, Virringvej 2, DK-8660 Skanderborg, Denmark

[21] Appl. No.: 497,600

[22] Filed: May 24, 1983

[30] Foreign Application Priority Data

May 24, 1982 [WO] PCT Int'l Appl. .................. PCT/DK82/00047

[51] Int. Cl.³ ............................................. B60C 23/00
[52] U.S. Cl. ...................................................... 141/95
[58] Field of Search .................. 73/146.3; 137/12, 557, 137/624.15, 624.2; 141/4, 38, 65, 83, 95, 197; 152/415

[56] References Cited

U.S. PATENT DOCUMENTS 3,026,916 3/1962 Kennedy ............................. 141/197
3,517,710 6/1970 Hawkes et al. ........................ 141/95
4,116,245 9/1978 Ayers ................................ 141/197 X
4,456,038 6/1984 Gwaltney et al. ..................... 141/95

Primary Examiner—Stephen Marcus
Assistant Examiner—Mark Thronson
Attorney, Agent, or Firm—Antonelli, Terry & Wands

[57] ABSTRACT

An apparatus for inflating tires of different sizes, in which a control unit operates to alternatingly connect the tire with a pressurized air source and a contact manometer, respectively. The length of the inflation periods may be adjusted according to the volume of the tire for achieving a maximized effective rate of inflation for each tire size. Two potentionmeters and their associated scales are calibrated in "tire diameter" and "tire width", respectively, whereby their combined series resistance will be analogous to the tire volume when the potentiometers are set in simple accordance with the "diameter" and "width" markings as printed on the side of all tires.

7 Claims, 6 Drawing Figures

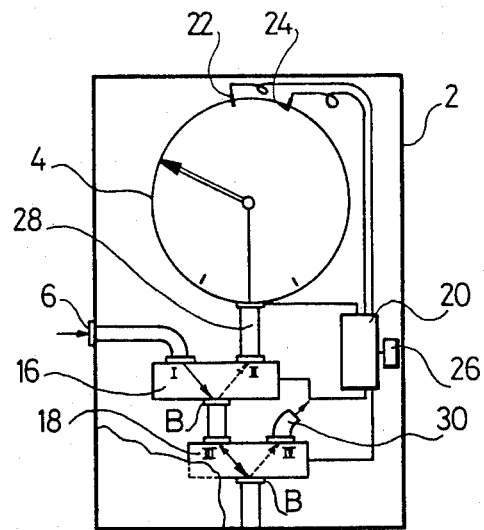
FIG. 1 (PRIOR ART)
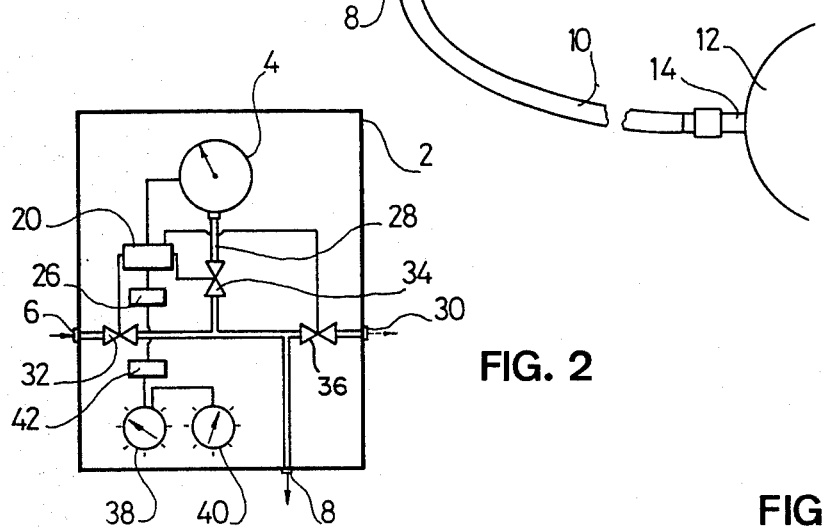
FIG. 2
FIG. 3
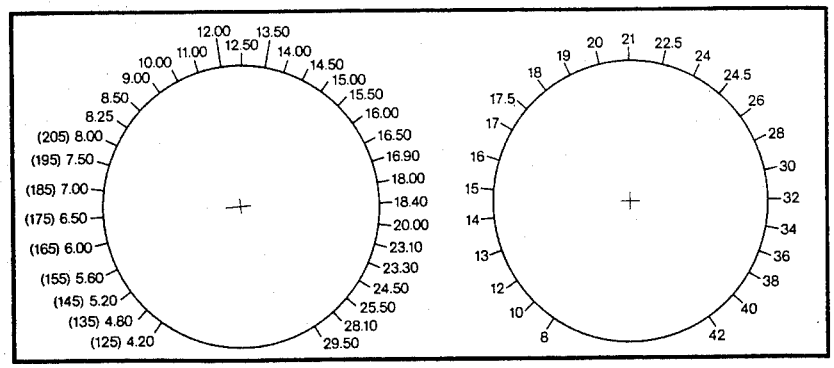

APPARATUS FOR CONTROLLING THE INFLATION OF TIRES

BACKGROUND AND SUMMARY OF THE INVENTION

This invention relates to an apparatus for inflating pneumatic tires of different sizes by first inflating a tire to a predetermined overpressure and then bleeding it to the desired final tire pressure, the apparatus being of the type comprising an inlet and an outlet for pressurized air and pressure regulating means mounted therebetween, the outlet being connectable with the tire, the pressure regulating means comprising a pressure gauge such as a contact manometer and switch valve means, which are controlled by a timer so as to alternatingly, during the inflation, connect the outlet with the inlet and the pressure gauge, respectively, to thereby produce alternating inflation periods and measuring periods, until the attainment of the predetermined overpressure is detected by the pressure gauge, which is operatively connected with control means for causing the switch valve means to alternatingly connect the outlet with the pressure gauge and an exhaust opening, respectively, in response to the attainment to produce alternating bleeding periods and measuring periods until the desired tire pressure is detected by the pressure gauge.

Especially for large size tires for trucks etc. it is desirable to effect the inflation in a well controlled automatic manner, and it is an official security requirement that the tires should be inflated to an overpressure and then bleeded to the final pressure. In practice it is of course important that the inflation is carried out as rapidly as possible, but the rapidity is counteracted by the fact that the actual tire pressure is not practically measurable constantly during the inflation, because a pressure gauge as simply connected with the inflation pipe or hose will not necessarily detect the tire pressure, but rather the inflation pressure in front of the narrow air inlet of the tire. A correct measurement of the tire pressure will require disconnection between the tire and the applied source of pressurized air, whereafter the tire pressure is measurable separately.

The said known type of apparatus is designed to operate according to this principle. The length of the measuring periods is chosen so as to ensure that the air pressure in the tire gets time to be propagated all the way to the pressure gauge, i.e. for securing a correct measuring of the pressure. The length of the inflation periods is chosen as a compromise between vey long periods, which would produce a resulting high inflation rate, because the inflation would be interrupted by the measuring periods few times only, and rather short periods, which would of course result in a low rate of inflation, but, however, also in a high accuracy with respect to the attainment of the desired tire pressure. According to the said compromise, a reasonable and necessary accuracy is achieved for an acceptable total rate of inflation, or rather an inflation rate having to be accepted by the users.

It is the purpose of the invention to provide an apparatus of the type referred to, which is controllable for optimizing the said compromise in an easy manner. The invention is based on the recognition that for a tire of slightly increased volume a given inflation accuracy will be obtainable with the use of a slightly increased average rate of inflation, and that such an increase or adjustment may be effected by causing the said timer to differentiate the length of the inflation periods in accordance with the size or volume of the individual tire to be inflated.

Accordingly, the apparatus of the invention is characterized in having selector means for the reading in of the volume of the tire to be inflated, these selector means being operatively connected with the timer in such a manner that the timer causes the length of the inflation periods to be variably adjusted substantially in accordance with the read in volume of the tire.

It will not be necessary for the selector means to cause any change of the length of the measuring periods, because the optimal length of these periods is almost an apparatus constant referring to the tire pressure propagating to the pressure gauge.

Tires are not normally provided with indication of their volume, but with indication as to their diameter and width, and the volume can be calculated on that basis. According to the invention, therefore, it is possible to combine the selector means with a volume calculator unit and then rely on a reading in of the tire diameter and width only, whereby the selector means may present themselves as two selector knobs cooperating with scales for tire diameter and width, respectively. Very little skill will then be required for the correct setting of the selector means.

The major part of the total inflation time refers to the inflation up to the predetermined overpressure, while the following bleeding is more rapidly accomplished. It could be acceptable, therefore, that the bleeding be effected by way of short duration bleeding periods between the measuring periods, so as to meet the accuracy requirements of small size tires with respect to the final tire pressure, while then larger sized tires would be bleedable with an even higher accuracy. However, when such increased accuracy is not required, it is more important to achieve a speeding up of the process even in this final phase thereof, and according to the invention, therefore, it is highly advantageous to let the selector means control not only the inflation periods, but also the corresponding bleeding periods.

BRIEF DESCRIPTION OF THE DRAWINGS

In the following the invention is described in more detail with reference to the drawing, in which:

FIG. 1 is a schematic view of a basic inflation apparatus,

FIG. 2 is a similar view of a modified apparatus according to the invention,

FIG. 3 is a plan view of the selector means thereof, and

DETAILED DESCRIPTION OF THE DISCLOSED EMBODIMENT

Figure 4:
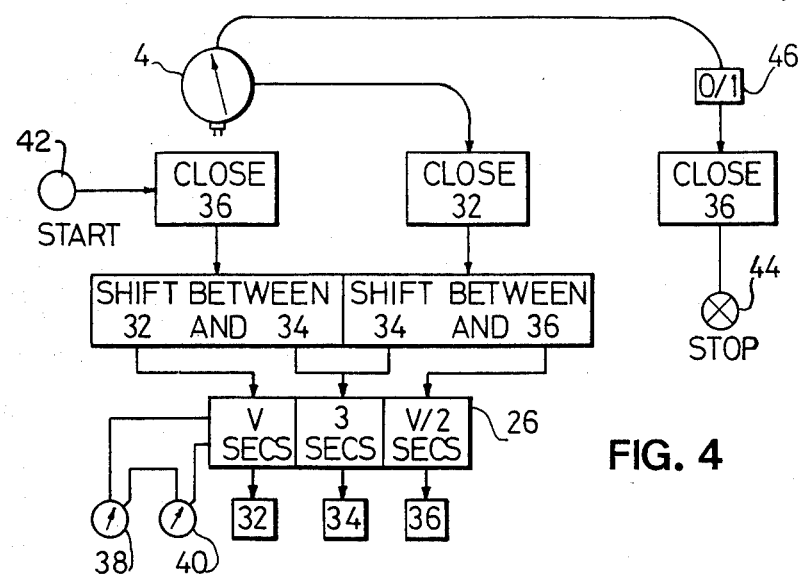
FIGS. 4-6 are diagrammatic illustrations of the apparatus.

The apparatus shown in FIG. 1 is contained within a housing 2 and comprises a contact manometer 4, an inlet 6 for pressurized air and an outlet 8, which continues in a hose 10 for leading pressurized air to a truck tire 12 through a valve nipple 14 of conventionel design. Prior to the inflation operation an inlet valve insert is removed from the nipple 14 for enabling a high rate of inflation and a later bleeding of the tire. The valve insert is remountable after the inflation without such remounting giving rise to any considerable loss of tire pressure, as is well known.

The apparatus comprises two solenoid switching valves 16 and 18 and an electric control unit 20 being connected partly with the solenoid valves and partly with the manometer 4, which comprises two adjustable contact elements 22 and 24. The control unit 20 comprises or is connected with a repetition rate timer 26.

Each of the solenoid valves comprises a basic stub B which with respect to the valve 18 is connected with the outlet 8, and each valve comprises two valve stubs I,II and III,IV, respectively, which by the switching of the valves can be connected with the respective basic stubs B. The stub B of the valve 16 is connected to valve stub III of valve 18, while the valve stub II is connected to the manometer 4 via a pipe 28 and the stub IV is either open or is connected to an exhaust pipe 30.

The inlet 6 for pressurized air is connected to the valve stub I, and in its inoperative position the valve 16 connects its stub B with the stub II, thus keeping the air inlet at stub I closed.

The function of the device is initiated by actuating a switch (not shown), whereby the control unit 20 causes the valve 16 to assume position B-I and the valve 18 to assume its position B-III. By means of the repetition rate timer 26 the valves are held in these positions during e.g. 10 seconds, whereby presurized air passes to the tire 12. Thereafter the timer 26 causes the valve 16 to switch into its position B-II for a time period of 2 to 3 seconds. During this short period of time, where the pressurized air supply is shut-off, an equalizing of the pressure takes place within the isolated space consisting of the tire 12, the hose 10, the communicating valve passages and the manometer tube 28, so that the manometer at the end of this period of time will indicate the real pressure inside the tire. Subsequently a switching-over to an inflation period of 10 seconds and a measuring period of 2 to 3 seconds takes place, and so on. In FIG. 1 the manometer pointer shows an intermediate tire pressure as existing after an inflation period midways during the inflation operation.

The tire should be inflated to an overpressure as determined by the setting of the contact element 24 of the manometer. Before this, the manometer pointer has to pass the contact element 22 representing the desired final pressure of the tire, but the control unit 20 is designed so as to be non-responsive to actuation of the contact element 22 during upward movement of the pointer.

When by this intermittent inflating and measuring operation of the apparatus the tire has attained the predetermined overpressure the contact element 24 triggers the control unit 20 to cause the valve 16 to switch to its position B-II in a following permanent manner, just as the valve 18 was previously fixed in its position B-III.

Hereupon the control unit 20 causes a switching of the valve 18 by means of the timer 26 to occupy position B-IV during e.g. 10 seconds, thereby producing a bleeding of the tire through the venting-stub 30. Thereafter the valve 18 is switched to its position B-III during e.g. 2 to 3 seconds whereby the manometer 4 will indicate the tire pressure as now somewhat lowered. After this follows a new bleeding phase and a measuring phase, and so on, until the manometer pointer actuates the contact element 22. This actuation causes the valve 18 to be blocked in its position B-III, and the control unit 20 may produce a sound or light signal indicative of the termination of the inflation operation. By means of the manometer the operator is able to ascertain that the wanted final pressure is attained, whereafter the operator may remove the hose 10 from the tire and remount the valve insert in the nipple 14.

The apparatus as shown in FIG. 1 generally belongs to the prior art, though it is easily modified according to the present invention, as will be clear from the following description of the apparatus shown in FIG. 2.

FIG. 2 of the drawing illustrates a modified embodiment, where the switching valves 16 and 18 are replaced by three separate, simple solenoid valves. These valves are designated 32, 34 and 36, while the other reference numerals remain unchanged. 32 designates a supply valve which is opened during the inflation periods, during which the valves 34 and 36 are kept closed. In the measuring periods during the inflation operation the valve 34 is opened to give access to the manometer, while the valves 32 and 36 are closed. Thus the control unit 20 serves to alternatingly open and close the valves 32 and 34 while keeping the bleeding valve 36 closed during the inflation phase. During the bleeding phase the control unit keeps the inlet valve 32 closed while alternatingly causing the valves 34 and 36 to open and close, respectively.

In FIG. 2 a pair of rotatable knobs 38 and 40 with associated scales are illustrated. These knobs belongs to potentiometers connected with the timer 26 through a calculator unit 42 with the purpose of making possible an adjustment of one or more of the discussed time periods. The scales carry indications of sizes of diameter and width of the tire respectively, i.e. the volume of a particular tire can easily be read in by corresponding positioning of the knobs, whereby the calculator unit 42 will produce an output representing the tire volume. The calculator output is supplied to the timer 26 so as to cause the timer to increase the length of the inflation periods and the bleeding periods in proportional accordance with the tire volume. The timer of course, should be designed so as to react accordingly, but it is deemed unnecessary at this place to describe the timer design in more detail.

In FIG. 3 an example of a scale set to be used in connection with the rotatable knobs 38 and 40 is illustrated. The scale figures agree with the internationally commonly used tire type designations which are printed on the sides of the tires. Before inflating a tire the operator adjusts the two rotatable knobs 38 and 40 so that they indicate scale figures which correspond to those printed on the tire and the inflating apparatus will then secure a safe and accurate inflation at maximum speed.

It will be understood that the apparatus as shown in FIG. 1 may correspondingly be provided with means for reading in the volume of the tire to be inflated and with additional control means for accordingly adapting the switch operations of the valves 16 and 18 to the requirements for maximum rate of inflation according to the tire volume.

It is of extreme importance that the scales of the selector knobs 38 and 40, FIG. 3, are calibrated in terms of "width" and "diameter", respectively, because these parameters are directly readable on the tires. The "diameter" refers to the wheel rim diameter, while the "width", as a standard does not refer to the geometrical width of the tire, but to a cross sectional peripheral measure of the tire, and these two indications or values have been found to define fairly accurately the volume of the tire. In practice it has proved sufficient to imitate the respective values by corresponding settings of the knobs 38 and 40 relative the scales as shown in FIG. 3, whereby the associated potentiometers, when connected in series, will present a total distance indicative of the tire volume. This total resistance is usable for causing the timer 26 to adjust the cyclic opening time of the inlet valve 32 in a simple linear manner for fulfilling the aim of the invention. Thus, in practice, the "calculator 42" may simply be constituted by a series connection of the potentiometers 38 and 40.

As mentioned, even the bleeding period length should be adjustable by the timer according to the tire volume, and the accuracy of the final tire pressure at the end of the bleeding operation, as defined by the setting of the manometer contact 22, will be higher than the required accuracy of the preceding overpressure.

In a preferred arrangement, therefore, the bleeding periods are shorter than the inflation periods, though still proportional to these whereby the total rate of bleeding will be smaller than the rate of inflation. But the bleeding phase is relatively short anyhow, and a short prolongation thereof by virtue of shortened bleeding periods will result in a highly increased and practically sufficient accuracy with respect to the final tire pressure.

A preferred and very simple manner of causing the bleeding periods to have proportionally reduced duration is based on the fact that in practice the settings of the two potentiometers 38 and 40 do not vary very much from each other, not even as much as shown in FIG. 2. An advantageous solution, therefore, is to arrange for the control unit 20 to simply short circuit one of the potentiometers in response to actuation of the manometer contact 24 whereby the total potentiometer resistance will drop to approximately 50%, and consequently the timer 26 will then cause the following bleeding periods to be about half as long as the previous inflation periods, though still with a length related to the tire volume.

Another specific and advantageous feature of FIG. 2, though not illustrated therein, is that the control unit 20 or the timer 26 is designed such that during the inflation phase a short delay, e.g. of ½-1 second is introduced between each closing of the inlet valve 32 and the associated opening of the manometer valve 34. The resulting advantage is that the manometer will not then be subjected, initially by the opening of the valve 34, to the full inflation pressure as was in the preceding moment present in the inflation hose 10; the inflation pressure may be some 12-14 bars, and though at the end of the measuring period it has been equalized with the lower tire pressure, it will nevertheless be present in the pipes immediately upon the closing of the inlet valve. Due to its inertia the manometer 4 will not rise to this high value before the hose pressure is decreased by said equalization, but the pointer is jerkwise effected, and under circumstances this could cause a false actuation of the manometer switch 24. By providing for the said short delay before opening of the valve 34 it is ascertained that the jerk action of the pointer is widely reduced.

FIG. 4 is a more detailed diagrammatic representation of the control system of the apparatus according to FIG. 2. Based on the above description it is believed that the diagram will be almost self-explanatory. The timer 26 produces a fixed timing, "3 secs", for the operation of the manometer valve 34, while for the operation of the inlet valve 32 it produces a timing, "V secs", which is analogous to the combined resistance of the potentiometers 38 and 40. From the value "V secs" is electronically derived the value "V/2 secs", which is used for the timing of the operation of the bleeding valve 36. The system comprises a start button 42, which may be combined with an indicator lamp, and a stop indicator lamp 44 operable to be switched on in response to the manometer pointer finally actuating the manometer contact 24. A unit 46, "0/1", is provided for making the manometer contact 22 inoperative in response to its actuation by the pointer during the inflation phase, i.e. during the rising of the pointer, while the contact 22 is thereafter operative as the pointer decends from the contact 24.

Figure 5:
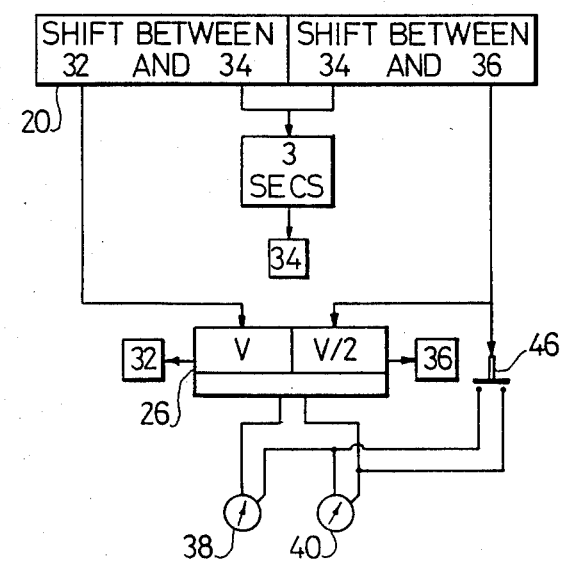

FIG. 5 correspondingly illustrates the said arrangement, in which the timing value "V/2 secs" is provided by the timer 26 in direct response to one of the potentiometers 38,40 being short circuited, by a switch 46, which is actuated whenever the control unit 20 operates to switch between the valves 34 and 36 during the bleeding phase. In the example shown the setting of the potentiometer 38 will determine the reduced length of the bleeding periods.

Figure 6:
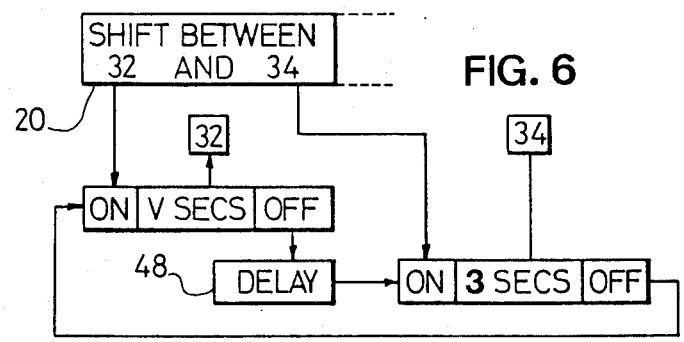

FIG. 6 illustrates the described use of a delay unit, designated 48, as interposed between the "off" control stage of the inlet valve 32 and the "on" control stage of the manometer valve 34.

I claim:

1. An apparatus for inflating pneumatic tires by first inflating a tire to a predetermined overpressure and then bleeding it to a desired tire pressure, comprising an inlet and an outlet for pressurized air and pressure regulating means mounted therebetween, said outlet being connectable with a tire, the pressure regulating means comprising a pressure gauge and switch valve means, which are controlled by a timer so as to alternatingly, during the inflation, connect the said outlet with the said inlet and the pressure gauge, respectively, to thereby produce alternating inflation periods and measuring periods, until the attainment of the predetermined overpressure is detected by the pressure gauge, which is operatively connected with control means for causing the switch valve means to alternatingly connect the said outlet with the pressure gauge and an exhaust opening, respectively, in response to said attainment to produce alternating bleeding periods and measuring periods until the desired tire pressure is detected by the pressure gauge, wherein the improvement comprises selector means for reading in the volume of the tire to be inflated, said selector means being operatively connected with the said timer in such a manner that the timer causes the length of the said inflation periods to be variably adjusted substantially in accordance with the read in volume of the tire, and wherein said selector means comprises separate selectors for enabling a direct reading in the diameter and width of said tire.

2. An apparatus according to claim 1, in which the timer operates to correspondingly adjust the length of the bleeding periods.

3. An apparatus according to claim 1, in which the selectors are series connected potentiometers.

4. An apparatus according to claim 2, in which the timer operates selectively such that the bleeding periods are proportional with, but shorter than the inflation periods.

5. An apparatus according to claim 3, in which the control means is operable to short circuit one of the potentiometers during said bleeding periods.

6. An apparatus according to claim 1, in which the timer and an associated control cooperate with three solenoid valves connecting the tire with the pressure gauge, the pressurized air input and an exhaust opening, respectively.

7. An apparatus according to claim 6, in which the control means or the timer is operable to open the pressure gauge valve with a small delay upon the closing of the air input valve.

* * * * *